(12) United States Patent
Lin et al.

(10) Patent No.: US 11,854,742 B2
(45) Date of Patent: Dec. 26, 2023

(54) CAPACITOR INTERGATED STRUCTURE.CAPACITOR UNIT AND MANUFACTURING PROCESS THEREOF

(71) Applicant: Powerchip Semiconductor Manufacturing Corporation, Hsinchu (TW)

(72) Inventors: Wei-Yu Lin, Hsinchu (TW); Kuo-Yu Yeh, Miaoli County (TW)

(73) Assignee: POWERCHIP SEMICONDUCTOR MANUFACTURING CORPORATION, Hsinchu (TW)

( * ) Notice: Subject to any disclaimer, the term of this patent is extended or adjusted under 35 U.S.C. 154(b) by 101 days.

(21) Appl. No.: 17/352,255

(22) Filed: Jun. 19, 2021

(65) Prior Publication Data
US 2022/0230806 A1 Jul. 21, 2022

(30) Foreign Application Priority Data
Jan. 20, 2021 (TW) .................................. 110102113

(51) Int. Cl.
*H01G 2/06* (2006.01)
*H01G 4/30* (2006.01)
(Continued)

(52) U.S. Cl.
CPC ............ *H01G 2/065* (2013.01); *H01G 4/232* (2013.01); *H01G 4/30* (2013.01); *H01G 4/33* (2013.01); *H01G 4/38* (2013.01)

(58) Field of Classification Search
CPC ............ H01G 2/065; H01G 4/30; H01G 4/33; H01G 4/38; H01G 4/232
See application file for complete search history.

(56) References Cited

U.S. PATENT DOCUMENTS

| 3,635,759 A * | 1/1972 | Howatt ............... H01G 4/30 29/25.42 |
| 7,913,368 B2 * | 3/2011 | Kim ................. H01G 13/00 29/25.03 |

(Continued)

FOREIGN PATENT DOCUMENTS

| CN | 103311204 A | 9/2013 |
| TW | 202018958 A | 5/2020 |
| WO | WO-2009088069 A1 * | 7/2009 ............ H01G 4/12 |

OTHER PUBLICATIONS

Official action issued by Taiwan Intellectual Property Office dated Dec. 15, 2021.

*Primary Examiner* — Jeffrey T Carley
(74) *Attorney, Agent, or Firm* — Chun-Ming Shih; LANWAY IPR SERVICES

(57) ABSTRACT

A capacitor integrated structure, a capacitor unit and a manufacturing process thereof are provided. The manufacturing process of capacitor units includes the steps of: forming a plurality of capacitor stacking structures on a substrate having an insulation layer thereon; performing a first cut on insulation dividers provided between the adjacent capacitor stacking structures to form a plurality of recesses that expose first conductive portion and second conductive portion of each of the capacitor stacking structures; filling a metallic material in the recesses to form a plurality of metallic dividers that are electrically connected to the first conductive portion and the second conductive portion of each of the capacitor stacking structures; performing a second cut on the metallic dividers to form a plurality of independent capacitor units; and forming metallic walls on two opposite sides of each of the capacitor units, so as to provide a capacitor unit having two end electrodes.

7 Claims, 21 Drawing Sheets

(51) Int. Cl.
*H01G 4/38* (2006.01)
*H01G 4/33* (2006.01)
*H01G 4/232* (2006.01)

(56) References Cited

U.S. PATENT DOCUMENTS

| | | | |
|---|---|---|---|
| 8,105,453 B2* | 1/2012 | Kawamura | H05K 3/0052 |
| | | | 156/89.12 |
| 9,589,903 B2* | 3/2017 | Chen | H01L 24/09 |
| 9,627,612 B2* | 4/2017 | BrightSky | H10N 70/8828 |
| 9,842,826 B2* | 12/2017 | Lin | H01L 23/49827 |
| 2010/0117050 A1* | 5/2010 | Chen | H10N 70/861 |
| | | | 438/102 |
| 2010/0300602 A1* | 12/2010 | Ichiyanagi | H01L 23/50 |
| | | | 156/89.12 |
| 2014/0247572 A1* | 9/2014 | Inagaki | H01L 23/645 |
| | | | 361/763 |
| 2016/0133688 A1* | 5/2016 | Chun | H01L 24/05 |
| | | | 257/532 |
| 2017/0301471 A1* | 10/2017 | Ono | H01G 4/224 |
| 2018/0033560 A1* | 2/2018 | Shin | H01G 4/1227 |

\* cited by examiner

CAPACITOR INTERGATED STRUCTURE.CAPACITOR UNIT AND MANUFACTURING PROCESS THEREOF

CROSS-REFERENCE TO RELATED APPLICATIONS

This application claims the priority of Republic of China Patent Application No. 110102113 filed on Jan. 20, 2021, in the State Intellectual Property Office of the R.O.C., the disclosure of which is incorporated herein by reference.

BACKGROUND OF THE INVENTION

Field of the Invention

The present invention relates to semiconductor technologies, and more particularly, to a capacitor integrated structure, a capacitor unit and a manufacturing process thereof.

Descriptions of the Related Art

Current complete capacitor manufacturing process, such as for MLCC (multi-layer ceramic chip) capacitors, includes powder milling, foil casting, printing, stacking, laminating, cutting, BBO (binder burn out), sintering, dipping, curing, electroplating, testing, and taping, etc. This process is quite mature, though complicated, giving the capacitors in sufficient supply and stable production for long time. Recently with technological innovations such as Internet, 5G communications, artificial intelligence, electric cars and so on, and with functional improvements of various electronic products, there are more and more demands in types and numbers of components being adopted. Active components are required with increased quantities and higher precision, thus greatly raising the number of passive components that are to be used with the active components, especially MLCC capacitors. This thereby results in short supply of the passive components, while manufacturers thereof have not yet found a solution to massive production to meet the market demands for passive components. Moreover, another issue is about fitting all required components in a limited space in order to have a high density layout of components, which must be achieved by using compact components with reduced area and/or volume. This is however quite challenging to conventional capacitor manufacturing technique in terms of size reduction or product precision improvement.

In view of this, compared to conventional MLCC production, the present invention uses different material, structure and manufacturing process so as to provide another option of capacitor for the market. The present invention also makes it easier to achieve area reduction of capacitors and thus improves product precision. The present invention further avoids a high temperature calcination procedure of the conventional MLCC manufacturing process, thereby in favor of energy saving, carbon reduction and cost decrease.

SUMMARY OF THE INVENTION

In view of the above drawbacks in the prior art, a primary object of the present invention is to provide a capacitor integrated structure, a capacitor unit and a manufacturing process thereof, thereby making capacitor internal connections easier to be formed, and making it able to produce the two end electrodes for the capacitor unit, just like a MLCC capacitor having two end electrodes.

In order to achieve the above objectives and other related objectives, an embodiment of the present application provides a manufacturing process of capacitor units, including the steps of: providing a substrate; forming an insulation layer on the substrate; forming a plurality of capacitor stacking structures on the insulation layer, wherein insulation dividers are provided between adjacent ones of the capacitor stacking structures, and each of the capacitor stacking structures has a first bonding pad, a first conductive portion, a second bonding pad and a second conductive portion; performing a first cutting procedure on the insulation dividers to form a plurality of recesses that expose the first conductive portion and the second conductive portion of each of the capacitor stacking structures; filling a metallic material in the recesses to form a plurality of metallic dividers that are electrically connected to the first conductive portion and the second conductive portion; and performing a second cutting procedure on the metallic dividers to form a plurality of independent capacitor units, wherein each of the capacitor units is provided with a first metallic wall and a second metallic wall on two opposite sides thereof; wherein in each of the capacitor units, the first bonding pad is electrically connected to the first conductive portion by the first metallic wall to form a first electrode, and the second bonding pad is electrically connected to the second conductive portion by the second metallic wall to form a second electrode.

Preferably, in the manufacturing process of capacitor units said above, wherein the substrate is a silicon substrate.

Preferably, in the manufacturing process of capacitor units said above, wherein the step of forming a plurality of capacitor stacking structures on the insulation layer further includes: forming a stacking structure layer on the insulation layer, wherein the stacking structure layer includes at least one interlayer conductive layer and at least one interlayer dielectric layer, which are staggered from each other, and the interlayer conductive layer has its first conductive portion and second conductive portion; and forming the first bonding pads and the second bonding pads on the stacking structure layer.

Preferably, in the manufacturing process of capacitor units said above, wherein the step of forming a stacking structure layer on the insulation layer further includes: forming a first interlayer conductive layer on the insulation layer, wherein the first interlayer conductive layer has first dielectrics, and the first conductive portion and the second conductive portion of the first interlayer conductive layer are defined by the first dielectrics; forming a first interlayer dielectric layer on the first interlayer conductive layer; forming a second interlayer conductive layer on the first interlayer dielectric layer, wherein the second interlayer conductive layer has second dielectrics, and the first conductive portion and the second conductive portion of the second interlayer conductive layer are defined by the second dielectrics; forming an isolation layer on the second interlayer conductive layer; forming first metallic pillars and second metallic pillars on the isolation layer, wherein the first metallic pillars and the second metallic pillars are arrayed with intervals therebetween; and forming a passivation layer to cover the isolation layer while partly expose the first metallic pillars and the second metallic pillars, wherein exposed parts of the first metallic pillars become the first bonding pads, and exposed parts of the second metallic pillars become the second bonding pads.

Preferably, in the manufacturing process of capacitor units said above, wherein the plurality of capacitor stacking structures are arrayed in X-axis direction and Y-axis direction of the substrate to form a matrix on the substrate, and wherein the manufacturing process further includes: providing an auxiliary layer under the substrate; performing the first cutting procedure in the X-axis direction of the substrate to cut the insulation dividers by a first cutting depth and a first cutting width to form the recesses, wherein the first cutting depth is a depth from top of each of the capacitor stacking structures to the insulation layer, and the first cutting width is not smaller than a predetermined width of each of the insulation dividers; filling the recesses to form the metallic dividers that are electrically connected to the capacitor stacking structures; performing the second cutting procedure in the X-axis direction of the substrate to cut the metallic dividers by a second cutting depth and a second cutting width to form a plurality of capacitor sets each comprising a plurality of the capacitor units, wherein the second cutting depth is a depth from top of each of the capacitor stacking structures to the auxiliary layer, and the second cutting width is smaller than the first cutting width, so as to allow the first metallic wall and the second metallic wall to be formed on two opposite sides of each of the capacitor units in the X-axis direction of the substrate; and cutting the capacitor sets in the Y-axis direction of the substrate to form the independent capacitor units.

Preferably, in the manufacturing process of capacitor units said above, wherein the auxiliary layer is a tape layer attached to bottom of the substrate.

Preferably, in the manufacturing process of capacitor units said above, wherein the first cutting procedure is performed by any of wheel cutting, dry etching cutting and laser scoring cutting; the filling step is performed by any of screen printing and electroplating; and the second cutting procedure is performed by wheel cutting.

Another embodiment of the present application provides a capacitor unit, for being bonded to a printed circuit board, including: a substrate; an insulation layer formed on the substrate; a capacitor stacking structure formed on the insulation layer, and having a first bonding pad, a first conductive portion, a second bonding pad and a second conductive portion; and a first metallic wall and a second metallic wall formed on two opposite sides of the capacitor stacking structure; wherein the first bonding pad is electrically connected to the first conductive portion by the first metallic wall to compose a first electrode, and the second bonding pad is electrically connected to the second conductive portion by the second metallic wall to compose a second electrode, and wherein the capacitor unit is bonded to the printed circuit board by the first bonding pad and the second bonding pad.

Preferably, in the capacitor unit said above, wherein the substrate is made of a wafer.

Preferably, in the capacitor unit said above, wherein the first metallic wall and the second metallic wall are located on two opposite sides of the capacitor stacking structure in a X-axis direction of the substrate, and the capacitor unit further includes a first insulation wall and a second insulation wall that are located on two opposite sides of the capacitor stacking structure in an Y-axis direction of the substrate, wherein the Y-axis direction is substantially vertical to the X-axis direction.

Another embodiment of the present application provides a capacitor integrated structure including: a wafer; a plurality of capacitor stacking structures arrayed in X-axis direction and Y-axis direction of the wafer to form a matrix on the wafer; a plurality of metallic dividers provided in the X-axis direction of the wafer between adjacent ones of the capacitor stacking structures; and a plurality of insulation dividers provided in the Y-axis direction of the wafer between adjacent ones of the capacitor stacking structures.

Preferably, in the capacitor integrated structure said above, wherein the capacitor integrated structure is cut in the X-axis direction and Y-axis direction of the wafer to form a plurality of independent capacitor units, wherein each of the capacitor units is for being bonded to a printed circuit board and includes: a part of the wafer; a capacitor stacking structure having a first bonding pad, a first conductive portion, a second bonding pad and a second conductive portion; a first metallic wall and a second metallic wall formed on two opposite sides of the capacitor stacking structure by cutting the metallic dividers; and a first insulation wall and a second insulation wall formed on other two opposite sides of the capacitor stacking structure by cutting the insulation dividers; wherein the first bonding pad is electrically connected to the first conductive portion by the first metallic wall to compose a first electrode, and the second bonding pad is electrically connected to the second conductive portion by the second metallic wall to compose a second electrode; and wherein the capacitor unit is bonded to the printed circuit board by the first bonding pad and the second bonding pad.

In summary, the present invention uses a wafer to produce a capacitor integrated structure including a plurality of capacitors. This allows mass production of the capacitors, and allows independent capacitors to be formed by cutting. Compared to the conventional MLCC manufacturing process, the present invention advantageously simplifies capacitor fabrication and avoids the undesirable high temperature calcination procedure of the MLCC manufacturing process, as well as utilizes existing semiconductor equipment to produce the capacitor integrated structure, thereby desirably reducing production costs.

Moreover, the present invention adopts semiconductor processing to form metallic walls on two opposite sides of a capacitor unit to thereby make the capacitor unit have two end electrodes. In a capacitor stacking structure of the capacitor unit, there is no need to additionally form electrical coupling holes for electrically connecting different layers of conductive portions, such that semiconductor processing for producing the capacitor unit as well as electrical connection processing for internal layers of conductive portions of the capacitor unit can both be simplified, thereby making capacitor internal connections easier to be formed, and making it able to produce the two end electrodes for the capacitor unit, just like a MLCC capacitor having two end electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
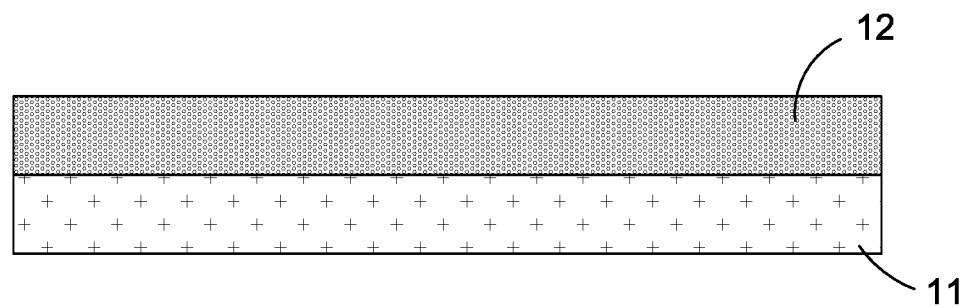
FIGS. 1, 2A, 2B, 3, 4A, 4B and 5 to 12 are flowchart schematic diagrams of a manufacturing process of capacitor units according to the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

The present invention provides a manufacturing process of capacitor units as described below. First, referring to FIG. 1, a substrate 11 is provided, and an insulation layer 12 is formed on the substrate 11. The substrate 11 can be, but not limited to, a silicon substrate made of wafer. It can alternatively be made of other materials, such as glass, quartz, and so on. The insulation layer 12 is made of a dielectric material and serves as a base insulation layer.

Figure 4A:
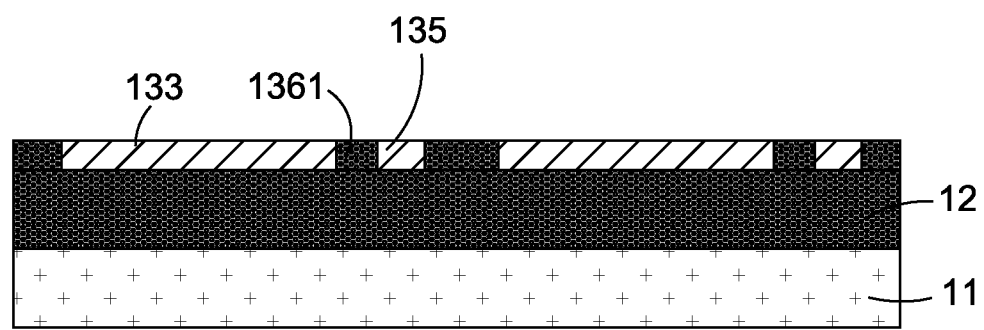
Figure 4B:
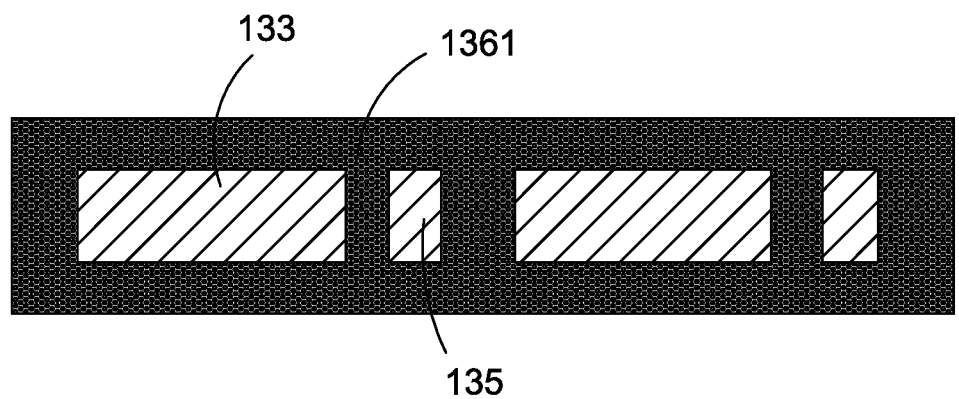
Figure 5:
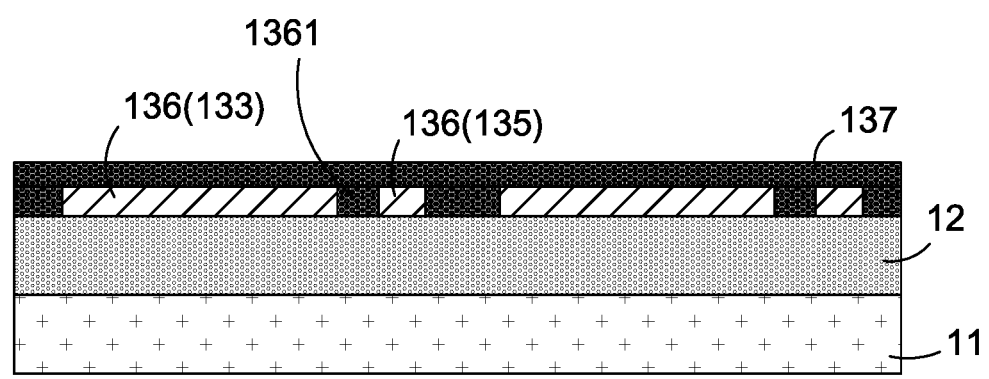
Figure 6:
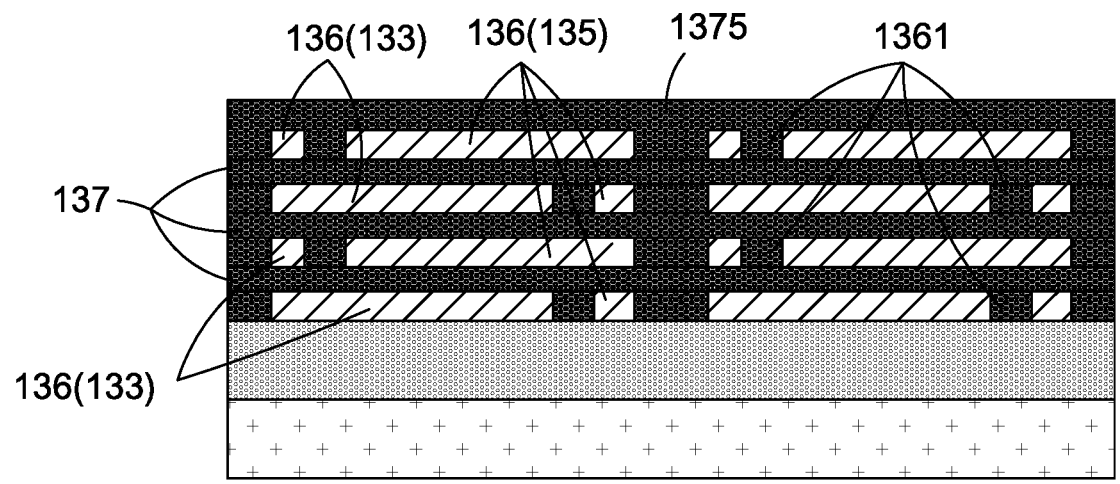
Figure 7:
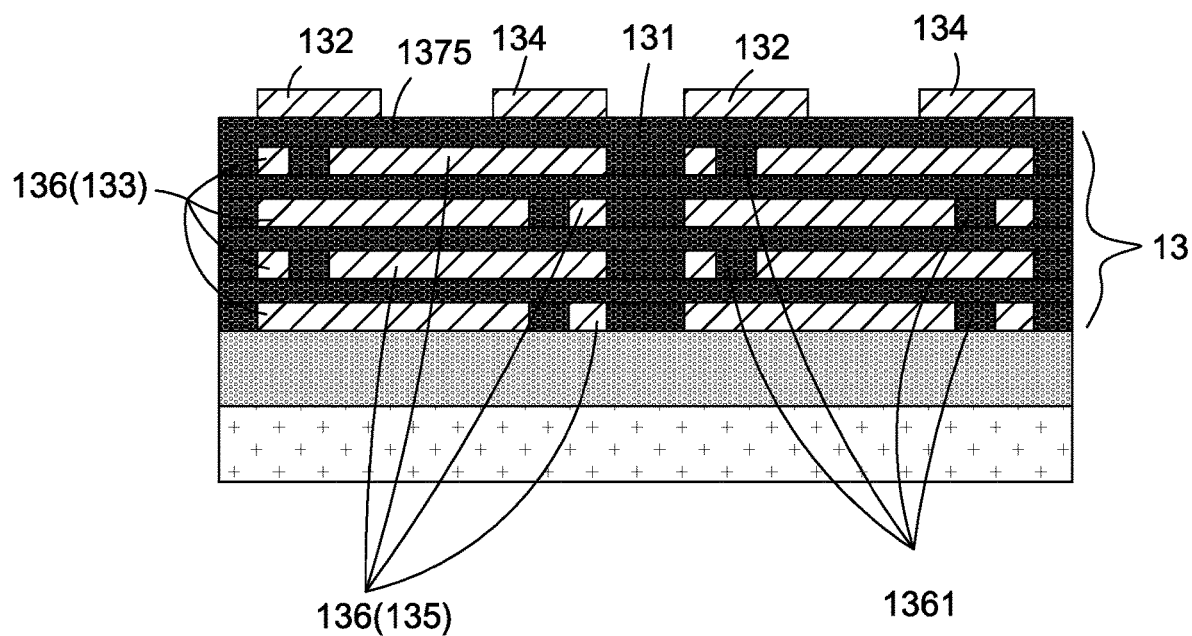

Then, as shown in FIGS. 5 to 7, a plurality of capacitor stacking structures 13 are formed on the insulation layer 12, and an insulation divider 131 is provided between any adjacent two of the capacitor stacking structures 13. The capacitor stacking structures 13 are arrayed in X-axis direction and Y-axis direction of the substrate 11 to form a matrix on the substrate 11. Each of the capacitor stacking structures 13 has a first bonding pad 132, first conductive portion 133, a second bonding pad 134 and second conductive portion 135 (to be described later according to FIGS. 2A, 2B, 3, 4A, 4B and 5 to 9).

To fabricate such a capacitor stacking structure 13 as described above, first, a stacking structure layer can be formed on the insulation layer 12, wherein the stacking structure layer includes at least one interlayer conductive layer 136 and at least one interlayer dielectric layer 137, which are staggered from each other. Each interlayer conductive layer 136 has its first conductive portion 133 and second conductive portion 135. Then, the first bonding pad 132 and the second bonding pad 134 are formed on the stacking structure layer to complete the capacitor stacking structure 13.

The capacitor stacking structures 13 on the insulation layer 12 are produced by the following steps described in detail with reference to FIGS. 2A, 2B, 3, 4A, 4B and 5 to 9.

Figure 2A:
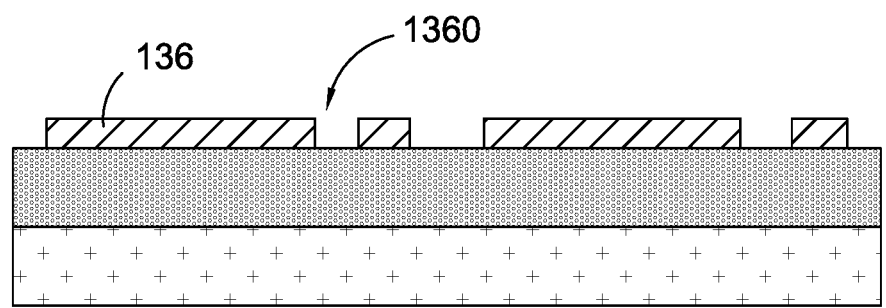
Figure 2B:
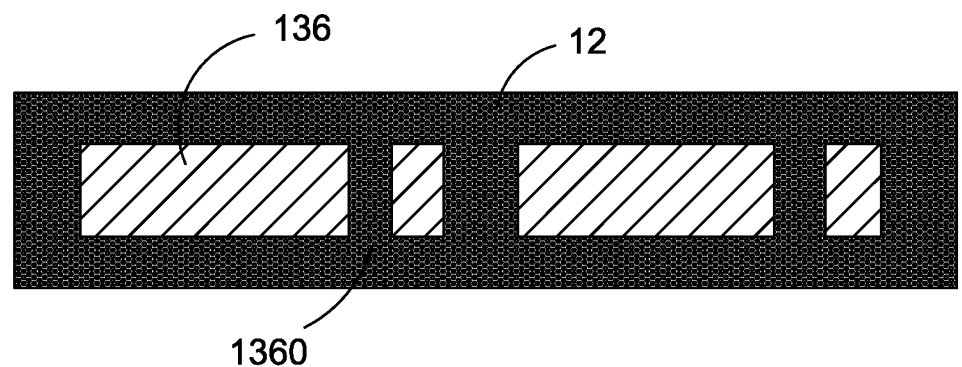

Referring to FIGS. 2A and 2B, a first interlayer conductive layer 136 is provided on the insulation layer 12 and serve as an electrode layer. The first interlayer conductive layer 136 is then etched to form gaps 1360.

Figure 3:
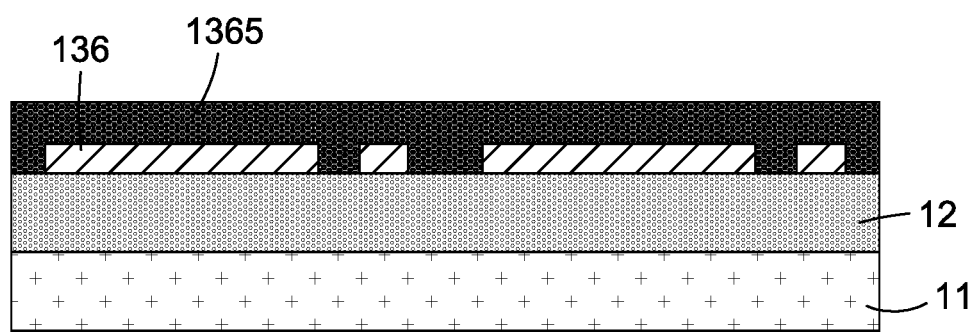

Referring to FIGS. 3 and 4A, a dielectric material 1365 is deposited on the first interlayer conductive layer 136 and fills the gaps 1360. It is then flattened to form first dielectrics 1361 in the first interlayer conductive layer 136. As shown in FIGS. 4A and 4B, provision of the first dielectrics 1361 defines first conductive portion 133 and the second conductive portion 135 of the first interlayer conductive layer 136.

Referring to FIG. 5, a first interlayer dielectric layer 137 is formed on the first interlayer conductive layer 136.

Referring to FIGS. 6 and 7, the steps described with reference to FIGS. 2A, 2B, 3, 4A, 4B and 5 for forming the first interlayer conductive layer 136 and the first interlayer dielectric layer 137 are repeated, so as to form a second interlayer conductive layer 136 with second dielectrics 1361 on the first interlayer dielectric layer 137, allowing the second interlayer conductive layer 136 to have first conductive portion 133 and second conductive portion 135, which are defined by the second dielectrics 1361, and then to form a second interlayer dielectric layer 137 on the second interlayer conductive layer 136, until a predetermined number of layers of the interlayer conductive layer 136 and interlayer dielectric layer 137 of the capacitor stacking structures 13 is reached. Then, an isolation layer 1375 is formed on a top one of the interlayer conductive layers 136, wherein there is an insulation divider 131 provided between any adjacent two of the capacitor stacking structures 13 as shown in FIG. 13C.

Then, referring to FIG. 7, a plurality of first metallic pillars 132 and second metallic pillars 134 are provided on the isolation layer 1375 and arrayed with intervals therebetween.

Figure 8:
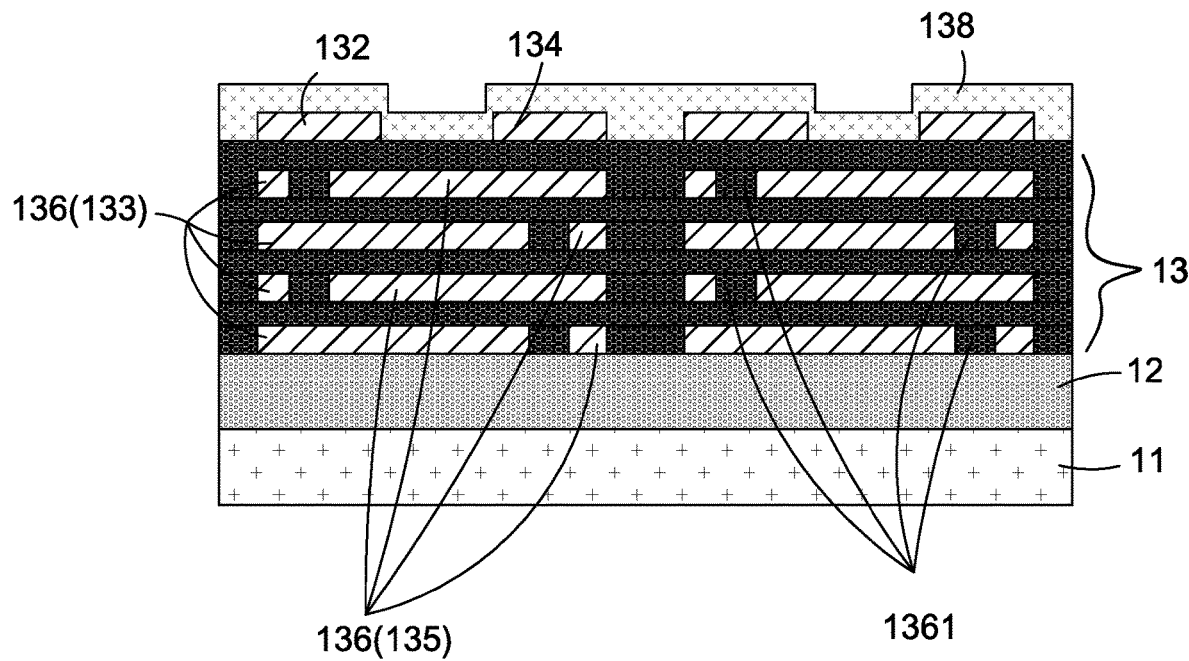
Figure 9:
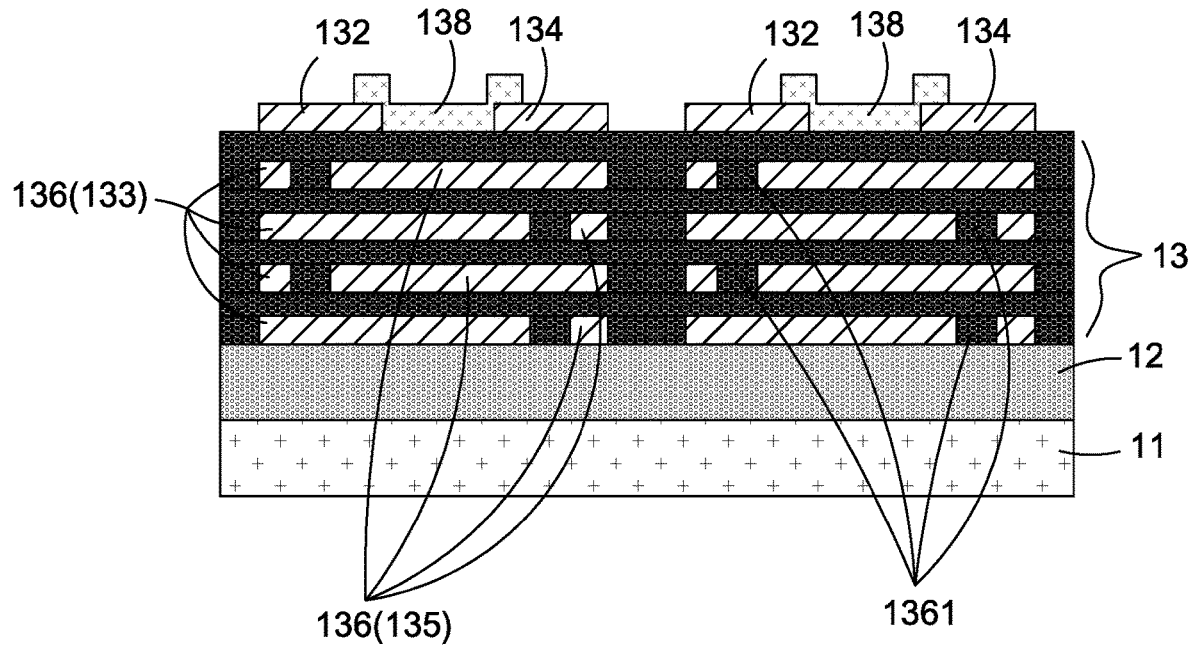

Then, referring to FIGS. 8 and 9, a passivation layer 138 is applied on and covers the isolation layer 1375, but allows the first metallic pillars 132 and the second metallic pillars 134 to be partly exposed respectively, wherein exposed parts of the first metallic pillars 132 become first bonding pads 132, and exposed parts of the second metallic pillars 134 become second bonding pads 134.

Figure 10:
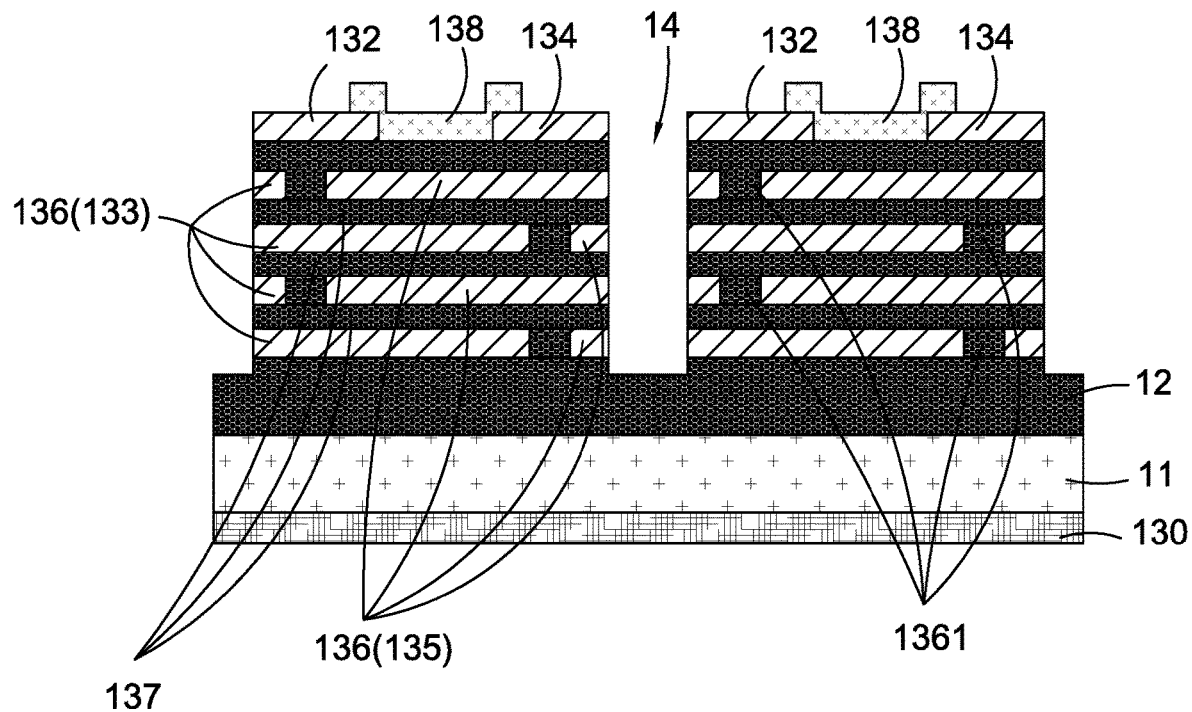

Referring to FIG. 10, after the capacitor stacking structures 13 are fabricated on the insulation layer 12, a first cutting procedure is performed on the insulation dividers 131 to form a plurality of recesses 14 that expose the first conductive portion 133 and the second conductive portion 135 of the capacitor stacking structures 13.

Particularly, an auxiliary layer 130 (such as a tape layer) can be attached to the bottom of the substrate 11 to enhance the strength of the substrate 11 during the first cutting procedure.

Moreover, the first cutting procedure can be done by any of wheel cutting, dry etching cutting and laser scoring cutting. It can proceed in an X-axis direction of the substrate 11 to cut the insulation dividers 131 by a first cutting depth and a first cutting width to form the recesses 14. As shown in FIGS. 9 and 10, the first cutting depth is a depth from the top of each of the capacitor stacking structures 13 to the insulation layer 12, and the first cutting width is not smaller than a predetermined width of each of the insulation dividers 131.

Figure 11:
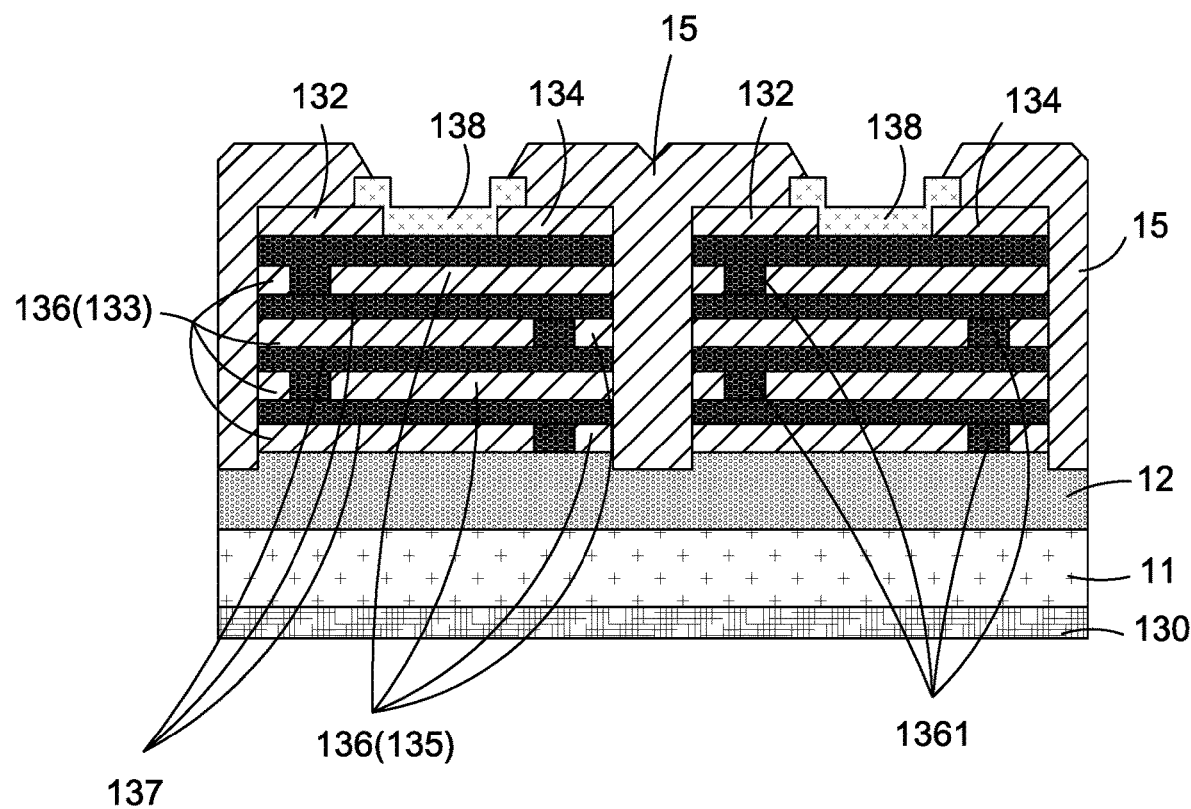
Figure 13A:
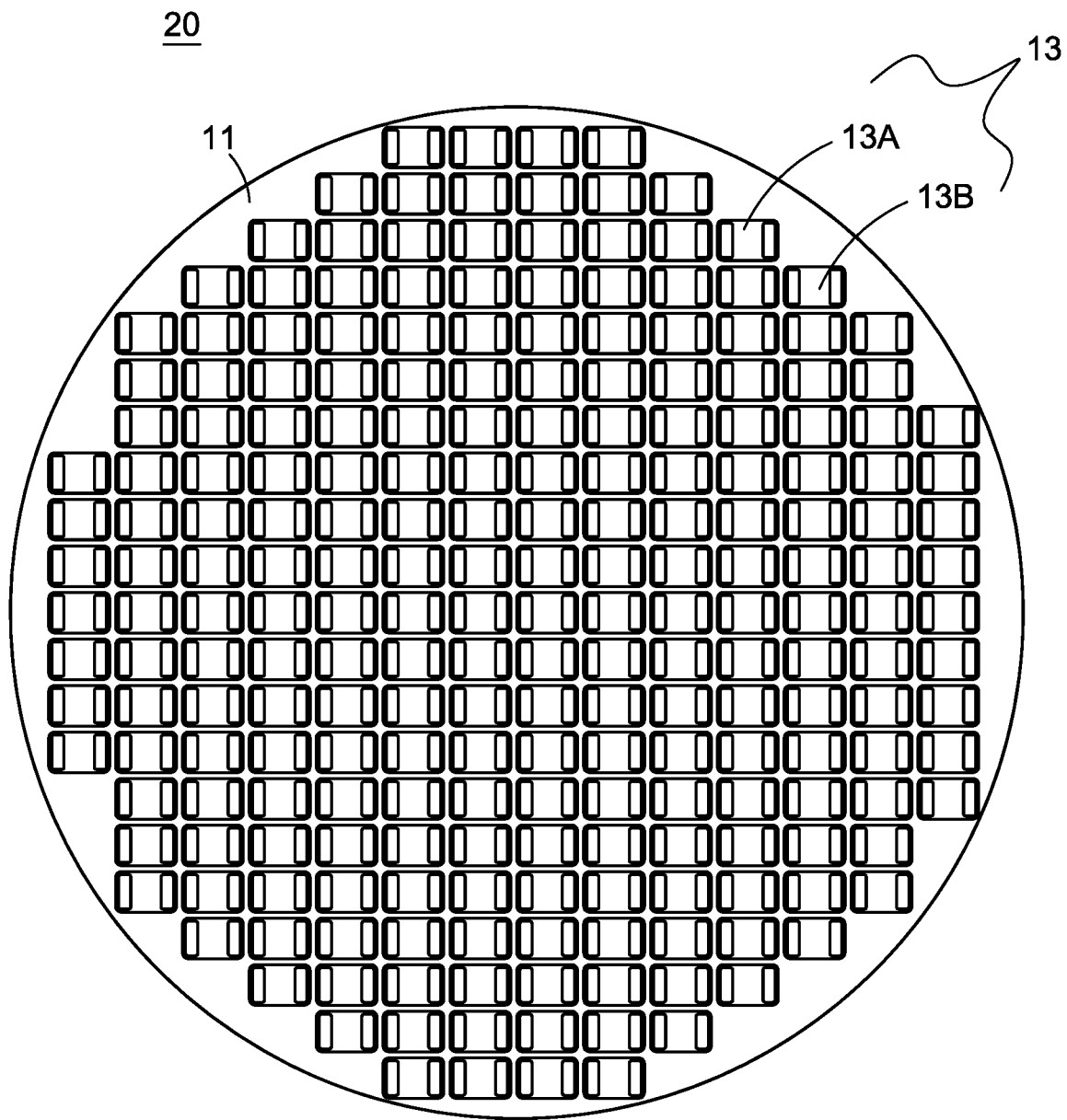
FIGS. 13A to 13F and 14 are structural schematic diagrams of capacitor units and a capacitor integrated structure according to the present invention.
Figure 13B:
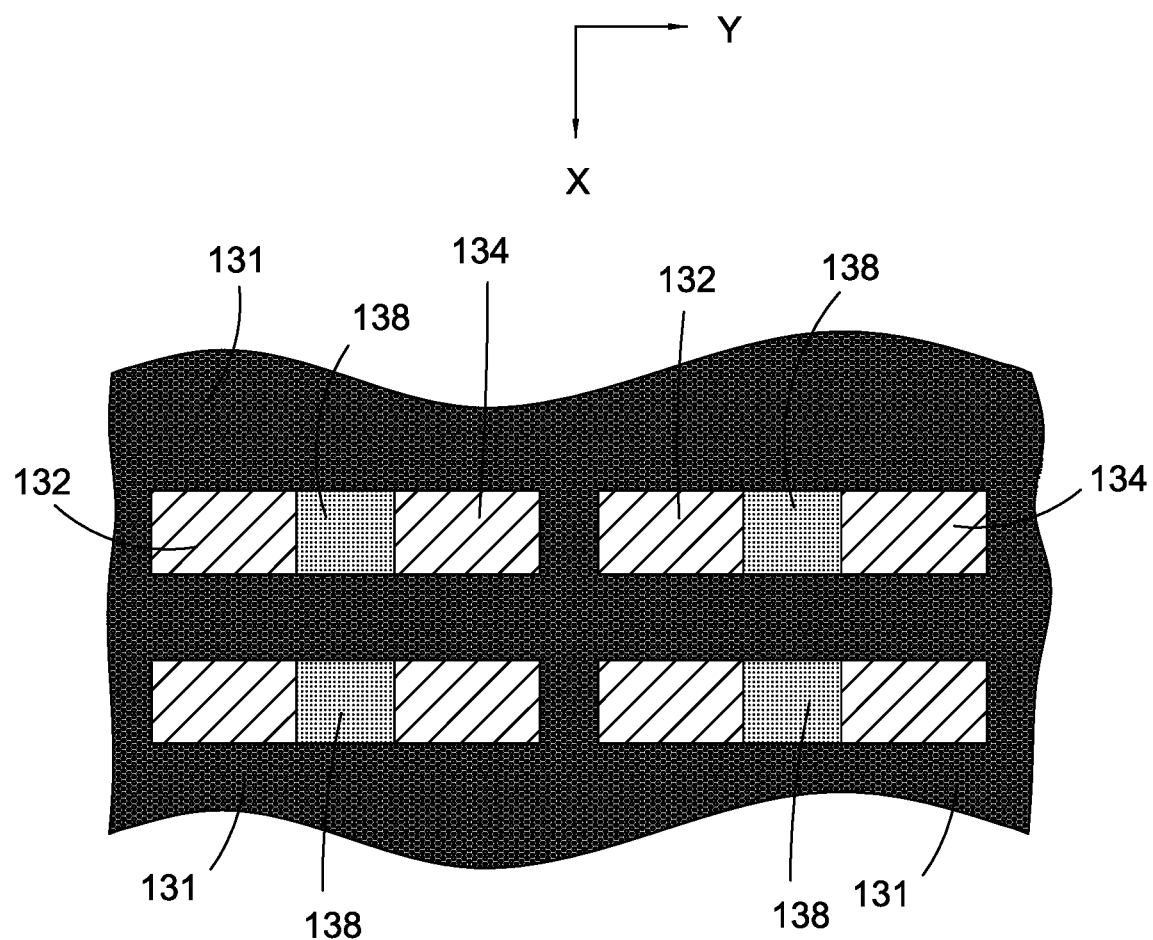
Figure 13C:
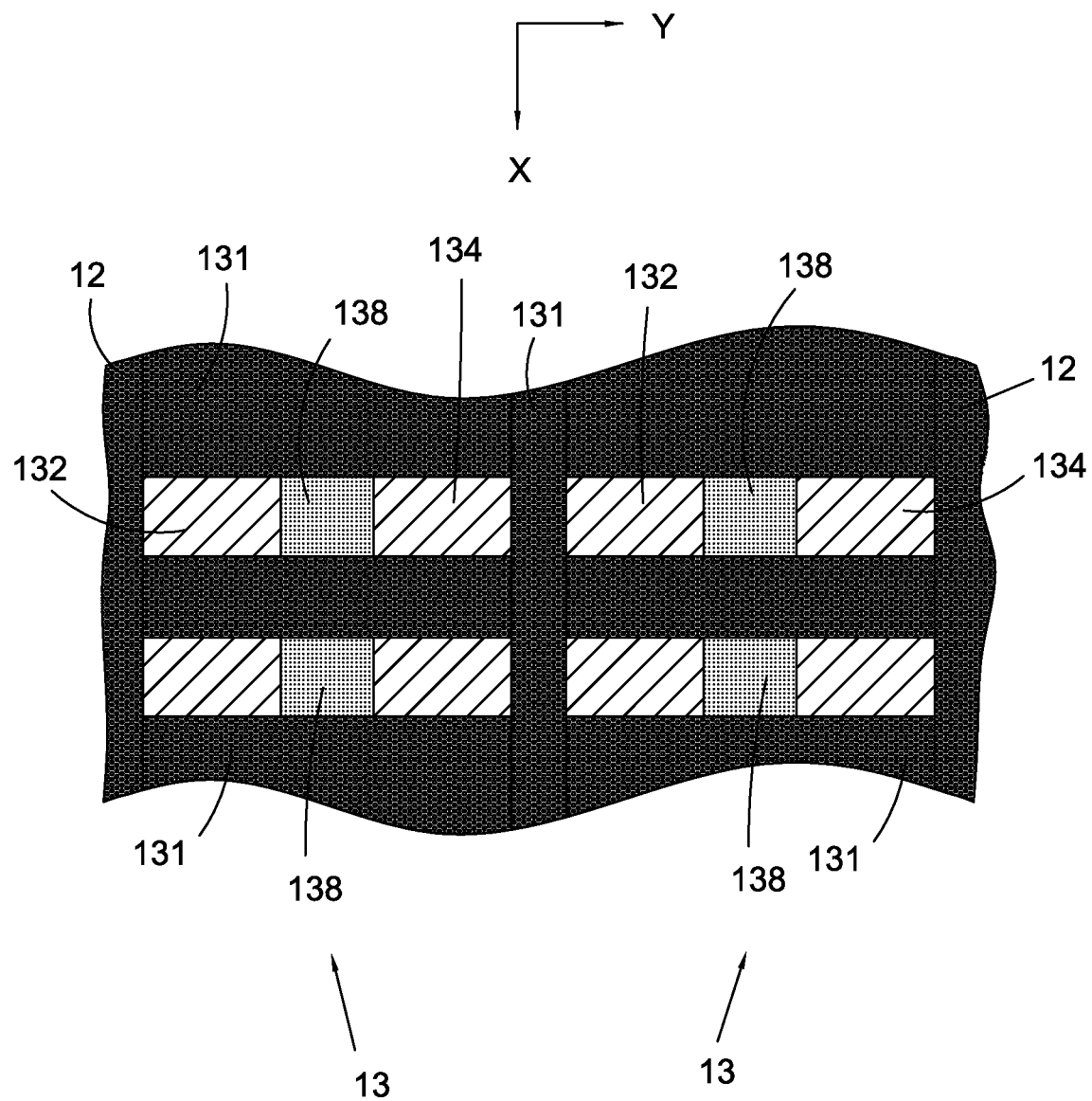
Figure 13D:
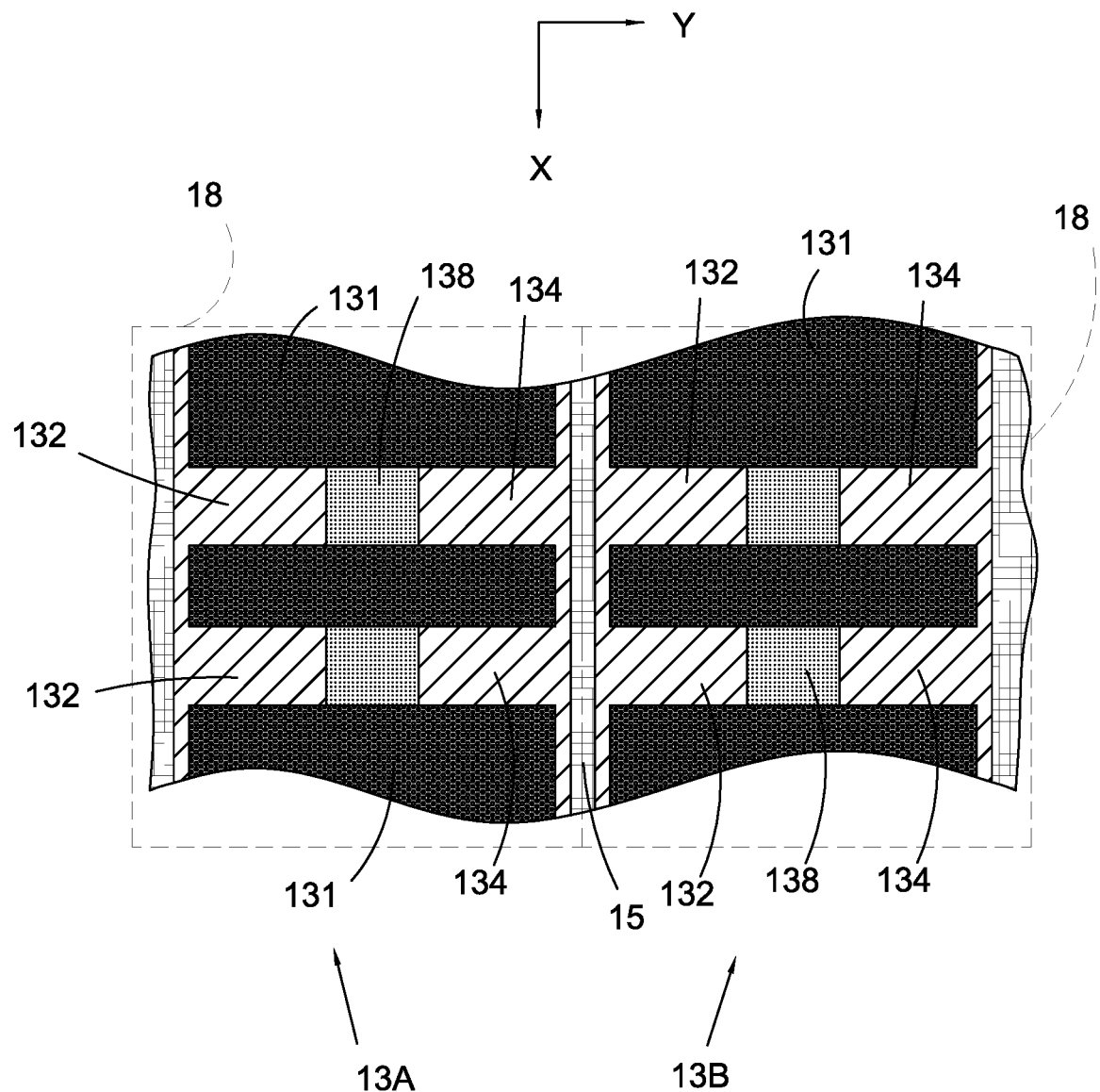
Figure 13E:
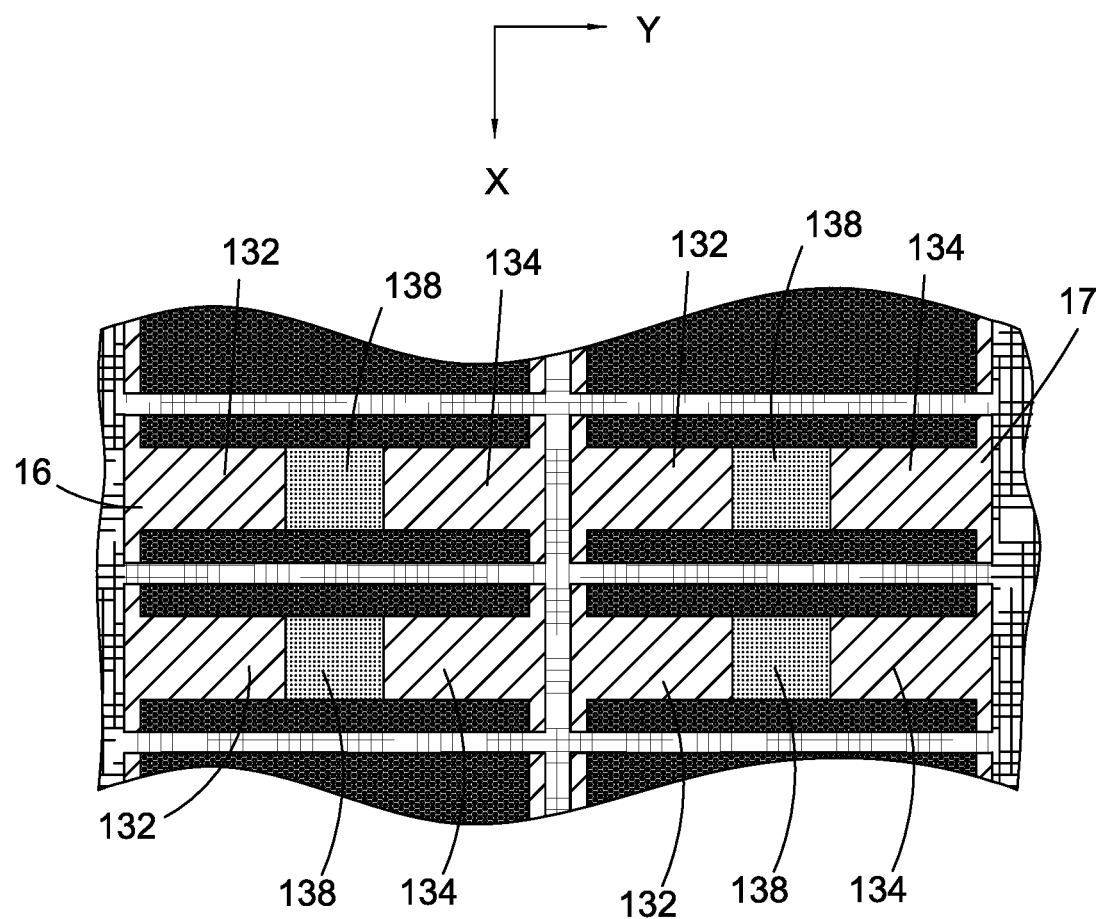

Then, referring to FIGS. 11 and 13C to 13D, a filling technique, such as screen printing or electroplating, is applied so as to fill a metallic material in all the recesses 14 and thus form a plurality of metallic dividers 15 that are electrically connected to the first conductive portion 133 and the second conductive portion 135.

Figure 12:
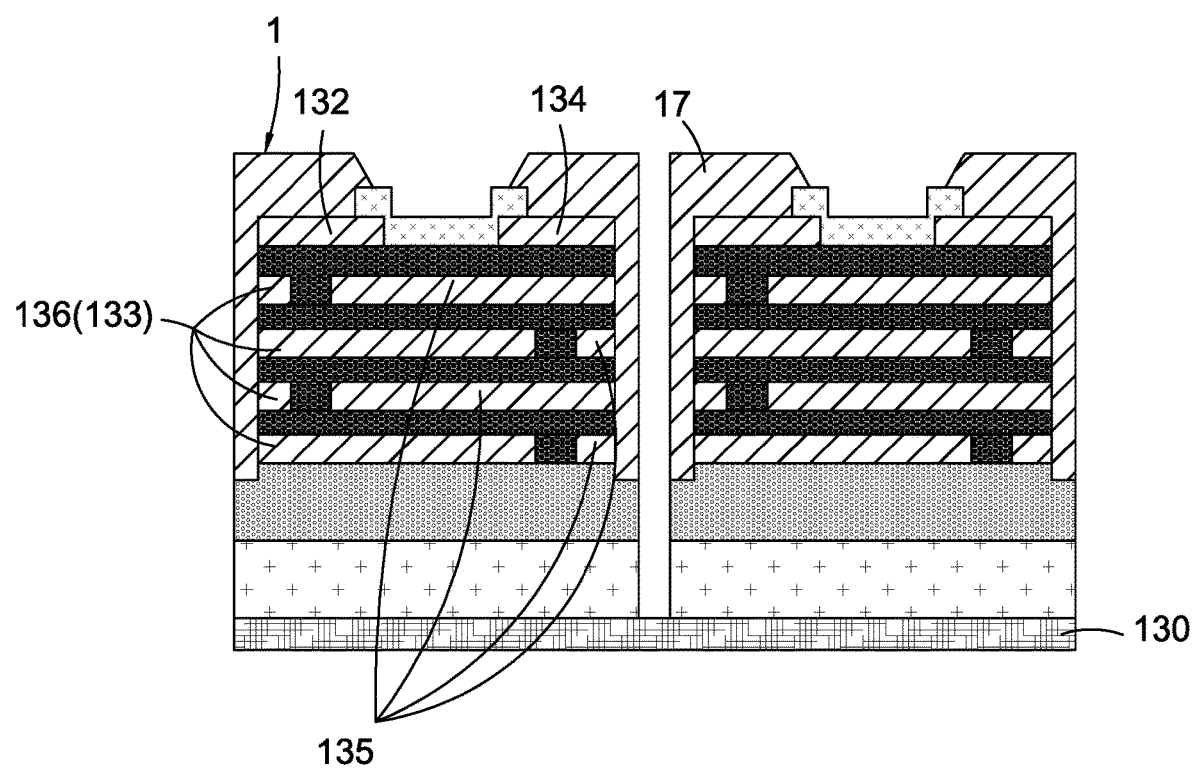
Figure 13F:
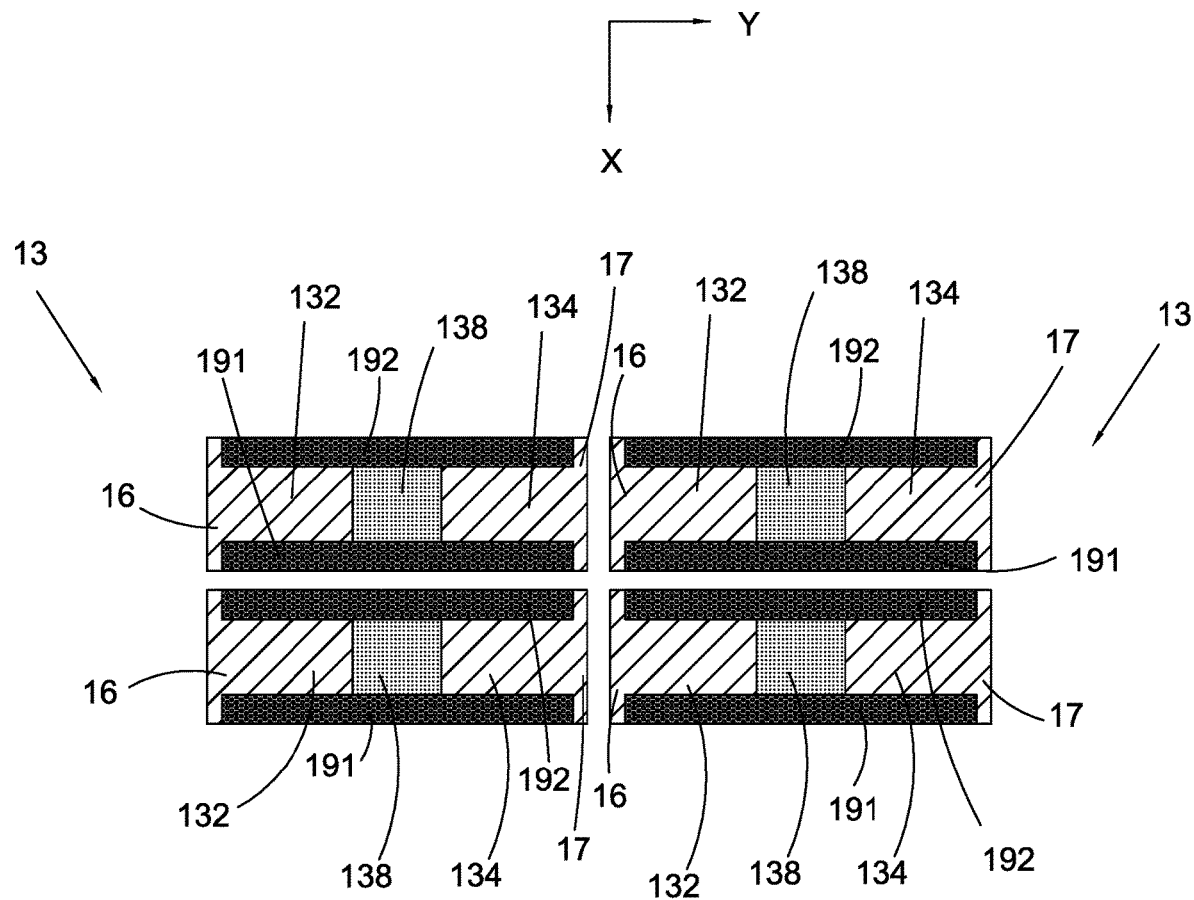

Referring to FIGS. 12 and 13F, a second cutting procedure is performed on the metallic dividers 15 to form a plurality of independent capacitor units 1.

Moreover, the second cutting procedure can be done by wheel cutting. It can proceed in the X-axis direction of the substrate 11 to cut the metallic dividers 15 by a second cutting depth and a second cutting width to form a plurality of capacitor sets 18 each comprising multiple capacitor units 1 (as shown in FIG. 13D), and then cutting is made in a Y-axis direction of the substrate 11 to cut the capacitor sets 18 to form a plurality of individual capacitor units 1 (as shown in FIG. 13F). The second cutting depth is a depth from the top of each of the capacitor stacking structures 13 to the auxiliary layer 130. The second cutting width is smaller than the first cutting width.

It should be noted that, as shown in FIG. 13F, each of the capacitor units 1 has a first metallic wall 16 and a second metallic wall 17 on its opposite sides in the X-axis direction of the substrate 11, and has a first insulation wall 191 and a second insulation wall 192 on its opposite sides in the Y-axis direction of the substrate 11. The first bonding pad 132 is electrically connected to the first conductive portion 133 by the first metallic wall 16 to become a first electrode, and the second bonding pad 134 is electrically connected to the second conductive portion 135 by the second metallic wall 17 to become a second electrode.

As shown in FIGS. 13A to 13F and 14, the present invention provides the plurality of capacitor units 1 each comprising the substrate 11, the insulation layer 12, the capacitor stacking structure 13, the first metallic wall 16 and the second metallic wall 17.

The substrate 11 is made of a wafer. The insulation layer 12 is provided on the substrate 11. The capacitor stacking structure 13 is formed on the insulation layer 12, and includes the first bonding pad 132, the first conductive portion 133, the second bonding pad 134 and the second conductive portion 135.

Selectively, the first bonding pad 132 is electrically connected to the first metallic wall 16 and the first conductive portion 133 to form a first electrode, and the second bonding pad 134 is electrically connected to the second metallic wall 17 and the second conductive portion 135 to form a second electrode.

Selectively, as shown in FIG. 13F, the first metallic wall 16 and the second metallic wall 17 are extended in the X-axis direction of the substrate 11 and located on two opposite sides of the capacitor stacking structure 13. The capacitor unit 1 further comprises the first insulation wall 191 and the second insulation wall 192 that are extended in the Y-axis direction of the substrate 11 and located on other two opposite sides of the capacitor stacking structure 13, wherein the Y-axis direction is substantially vertical to the X-axis direction.

As shown in FIGS. 13A and 13D, the present invention provides a capacitor integrated structure 20 comprising a wafer 11 and a plurality of capacitor stacking structures 13A, 13B. The capacitor stacking structures 13A, 13B are arrayed in X-axis direction and Y-axis direction of the wafer 11 to form a matrix on the wafer 11. There is a metallic divider 15 provided between any adjacent two of the capacitor stacking structures 13A, 13B in the X-axis direction of the wafer 11, and there is an insulation divider 131 provided between any adjacent two of the capacitor stacking structures 13A, 13B in the Y-axis direction of the wafer 11, such that the capacitor integrated structure 20 can be cut in the X-axis direction and Y-axis direction to form a plurality of independent capacitor units 1.

Figure 14:
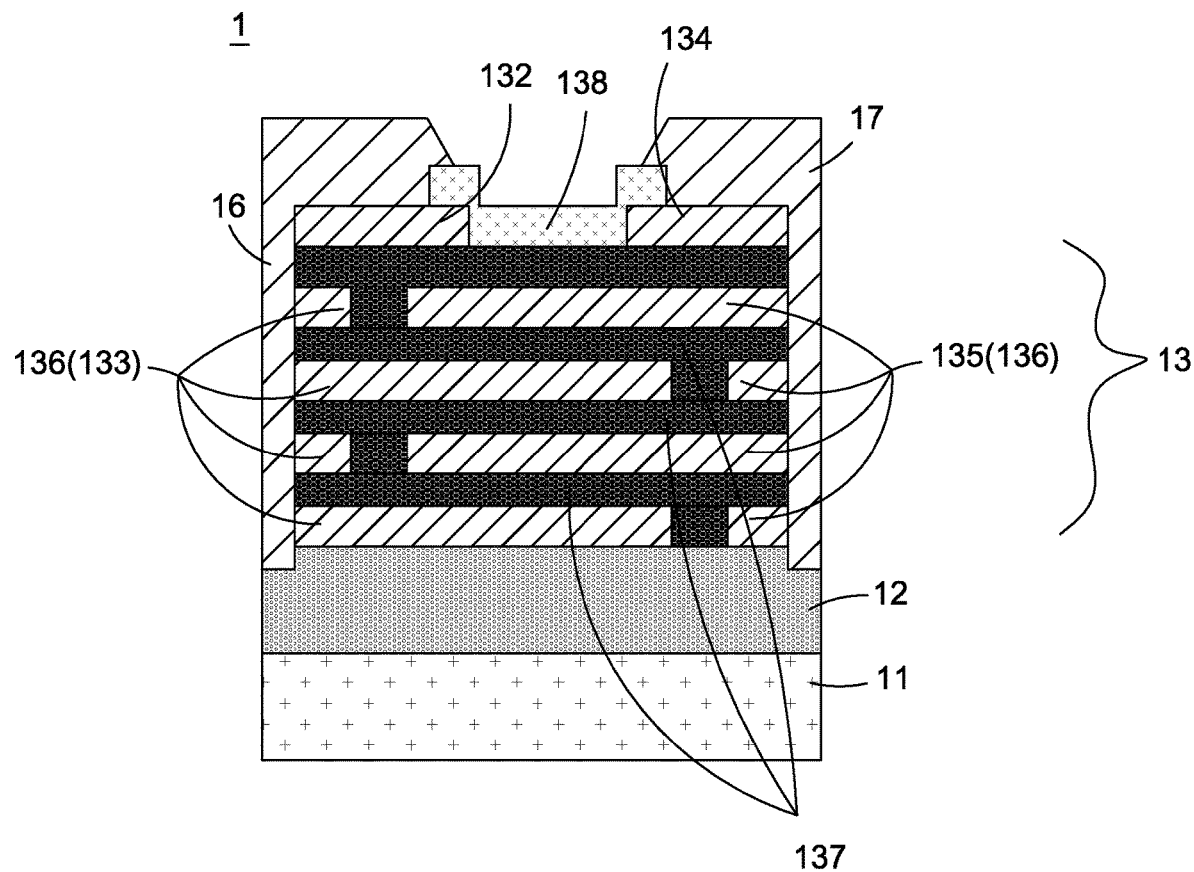

Particularly, as shown in FIGS. 13F and 14, each of the capacitor units 1 comprises a part of the wafer 1. Its capacitor stacking structure 13 includes a first bonding pad 132, a first conductive portion 133, a second bonding pad 134 and a second conductive portion 135. By cutting the metallic divider 15, a first metallic wall 16 and a second metallic wall 17 can be formed on two opposite sides of the capacitor stacking structure 13. By cutting the insulation divider 131, a first insulation wall 191 and a second insulation wall 192 can be formed on other two opposite sides of the capacitor stacking structure 13. The first bonding pad 132 can be electrically connected to the first conductive portion 133 by the first metallic wall 16 to compose a first electrode. The second bonding pad 134 can be electrically connected to the second conductive portion 135 by the second metallic wall 17 to compose a second electrode.

Therefore, with the manufacturing process of capacitor units proposed in the present invention, there can be formed a first metallic wall and a second metallic wall on two opposite sides of a capacitor unit, allowing the first metallic wall to electrically connect a first bonding pad to a first conductive portion of the capacitor unit to compose a first electrode, and allowing the second metallic wall to electrically connect a second bonding pad to a second conductive portion of the capacitor unit to compose a second electrode, thereby making the capacitor unit formed with two end electrodes by semiconductor processing.

Further, with the first metallic wall for electrically connecting the first bonding pad to the first conductive portion, and with the second metallic wall for electrically connecting the second bonding pad to the second conductive portion, there is no need to additionally form electrical coupling holes in the capacitor stacking structure of the capacitor unit to achieve electrical connection between different layers of conductive portions, such that semiconductor processing for producing such a capacitor unit as well as electrical connection processing for internal layers of conductive portions of the capacitor unit can both be simplified.

Moreover, the present invention allows a plurality of capacitor stacking structures to be formed on a wafer to produce a capacitor integrated structure including a plurality of capacitor units, such that the capacitor integrated structure can simply be cut to massively produce individual capacitor units that can be used as capacitors. Compared to the conventional MLCC production, the present invention can simplify the capacitor structure and its manufacturing process, thereby reducing capacitor area and improving product precision. The present invention further avoids the undesirable high temperature calcination procedure of the conventional MLCC manufacturing process, thereby reducing production costs of the capacitors.

The examples above are only illustrative to explain principles and effects of the invention, but not to limit the invention. It will be apparent to those skilled in the art that modifications and variations can be made without departing from the scope of the invention. Therefore, the protection range of the rights of the invention should be as defined by the appended claims.

What is claimed is:

1. A manufacturing process of capacitor units, including the steps of:
providing a substrate;
forming an insulation layer on the substrate;
forming at least three capacitor stacking structures on the insulation layer, wherein a plurality of insulation dividers are provided between adjacent ones of the capacitor stacking structures, and each of the capacitor stacking structures has a first bonding pad, a first conductive portion, a second bonding pad and a second conductive portion;
cutting the insulation dividers to form a plurality of recesses that expose the first conductive portion and the second conductive portion of each of the capacitor stacking structures;
filling a metallic material in the recesses to form a plurality of metallic dividers that are electrically connected to the first conductive portion and the second conductive portion; and
cutting the metallic dividers to form a plurality of independent capacitor units, wherein each of the capacitor units has a first metallic wall and a second metallic wall on two opposite sides thereof;
wherein in each of the capacitor units, the first bonding pad is electrically connected to the first conductive portion by the first metallic wall to form a first electrode, and the second bonding pad is electrically connected to the second conductive portion by the second metallic wall to form a second electrode.

2. The manufacturing process of capacitor units according to claim 1, wherein the substrate is a silicon substrate.

3. The manufacturing process of capacitor units according to claim 1, wherein the step of forming at least three capacitor stacking structures on the insulation layer further includes:

forming a stacking structure layer on the insulation layer, wherein the stacking structure layer includes at least one interlayer conductive layer and at least one interlayer dielectric layer, which are staggered from each other, and the interlayer conductive layer has the first conductive portion and the second conductive portion; and forming the first bonding pad and the second bonding pad on the stacking structure layer.

4. The manufacturing process of capacitor units according to claim 3, wherein the stacking structure layer includes a first and a second interlayer conductive layers, and the step of forming at least three capacitor stacking structures on the insulation layer further includes:

forming the first interlayer conductive layer on the insulation layer, wherein the first interlayer conductive layer has first dielectrics;

forming the interlayer dielectric layer on the first interlayer conductive layer;

forming the second interlayer conductive layer on the interlayer dielectric layer, wherein the second interlayer conductive layer has second dielectrics;

forming an isolation layer on the second interlayer conductive layer;

forming first metallic pillars and second metallic pillars on the isolation layer, wherein the first metallic pillars and the second metallic pillars are arrayed with intervals therebetween; and forming a passivation layer to cover the isolation layer while leaving parts of the first metallic pillars and the second metallic pillars exposed, wherein exposed parts of the first metallic pillars become the first bonding pads, and exposed parts of the second metallic pillars become the second bonding pads.

5. The manufacturing process of capacitor units according to claim 1, wherein the plurality of capacitor stacking structures are arrayed in X-axis direction and Y-axis direction of the substrate to form a matrix on the substrate, and wherein the manufacturing process further includes:

providing an auxiliary layer under the substrate;

performing the first cutting procedure in the X-axis direction of the substrate to cut the insulation dividers by a first cutting depth and a first cutting width to form the recesses, wherein the first cutting depth is a depth from top of each of the capacitor stacking structures to the insulation layer, and the first cutting width is not smaller than a predetermined width of each of the insulation dividers;

filling the recesses to form the metallic dividers that are electrically connected to the capacitor stacking structures;

performing the second cutting procedure in the X-axis direction of the substrate to cut the metallic dividers by a second cutting depth and a second cutting width to form a plurality of capacitor sets each comprising a plurality of the capacitor units, wherein the second cutting depth is a depth from top of each of the capacitor stacking structures to the auxiliary layer, and the second cutting width is smaller than the first cutting width, so as to allow the first metallic wall and the second metallic wall to be formed on two opposite sides of each of the capacitor units in the X-axis direction of the substrate; and cutting the capacitor sets in the Y-axis direction of the substrate to form the independent capacitor units.

6. The manufacturing process of capacitor units according to claim 5, wherein the auxiliary layer is a tape layer attached to bottom of the substrate.

7. The manufacturing process of capacitor units according to claim 1, wherein, cutting the insulation dividers is performed by any of wheel cutting, dry etching cutting and laser scoring cutting;

the filling step is performed by any of screen printing and electroplating; and cutting the metallic dividers is performed by wheel cutting.

* * * * *